United States Patent
Succi et al.

(10) Patent No.: US 9,695,049 B2
(45) Date of Patent: Jul. 4, 2017

(54) SYSTEM AND METHOD FOR ULTRA HIGH PURITY (UHP) CARBON DIOXIDE PURIFICATION

(71) Applicant: SAES GETTERS S.P.A., Lainate (IT)

(72) Inventors: Marco Succi, Milan (IT); Cristian Landoni, Novara (IT); Sarah Vogt, Grover Beach, CA (US); Charles H. Applegarth, San Luis Obispo, CA (US)

(73) Assignee: SAES GETTERS S.P.A., Lainate (IT)

( * ) Notice: Subject to any disclaimer, the term of this patent is extended or adjusted under 35 U.S.C. 154(b) by 0 days.

(21) Appl. No.: 15/125,132

(22) PCT Filed: Mar. 5, 2015

(86) PCT No.: PCT/IB2015/051614
§ 371 (c)(1),
(2) Date: Sep. 9, 2016

(87) PCT Pub. No.: WO2015/136416
PCT Pub. Date: Sep. 17, 2015

(65) Prior Publication Data
US 2017/0044019 A1     Feb. 16, 2017

(30) Foreign Application Priority Data

Mar. 14, 2014   (IT) .............................. MI2014A0415

(51) Int. Cl.
*B01D 53/00*     (2006.01)
*B01J 23/44*     (2006.01)
(Continued)

(52) U.S. Cl.
CPC .............. *C01B 31/20* (2013.01); *B01D 53/00* (2013.01); *B01D 53/864* (2013.01); *B01J 23/44* (2013.01);
(Continued)

(58) Field of Classification Search
CPC .................. B01D 53/00; B01D 53/864; B01D 2255/1023; B01D 2255/20753;
(Continued)

(56) References Cited

U.S. PATENT DOCUMENTS

| | | | |
|---|---|---|---|
| 2,999,008 A * | 9/1961 | Diebold | C01B 31/20 422/614 |
| 5,674,463 A | 10/1997 | Dao et al. | |
| 5,902,561 A * | 5/1999 | Carrea | C01B 21/0483 423/210 |
| 6,511,640 B1 * | 1/2003 | Kumar | B01D 53/0462 423/210 |
| 2003/0143129 A1 | 7/2003 | Rabellino et al. | |
| 2005/0265912 A1 * | 12/2005 | Alvarez, Jr. | B01D 53/02 423/224 |
| 2006/0143129 A1 * | 6/2006 | Holm | G06F 8/61 705/52 |
| 2010/0284892 A1 * | 11/2010 | Grover | B01D 53/343 423/437.1 |

(Continued)

FOREIGN PATENT DOCUMENTS

| | | |
|---|---|---|
| EP | 1 166 845 A1 | 1/2002 |
| WO | 2004/035178 A1 | 4/2004 |

(Continued)

OTHER PUBLICATIONS

International Search Report and Written Opinion for International Application No. PCT/IB2015/051614 in the name of SAES GETTERS S.P.A.; Mail Date: May 19, 2015; 11 pages.

*Primary Examiner* — Colleen Dunn
(74) *Attorney, Agent, or Firm* — Steinfl + Bruno LLP

(57) ABSTRACT

An Ultra High Purity (UHP) carbon dioxide purification system and a method for purification of UHP carbon dioxide is disclosed. The purification system includes supported nickel oxide and supported palladium oxide. An upper portion of the purification system is at least partially filled with supported nickel oxide, and a lower portion of the purification system is at least partially filled with supported palladium oxide. The upper and lower portions of the purification system have a physical separation but are in fluid communication. The method includes purification or pre-purification of High Purity (HP) carbon dioxide to Ultra High Purity (UHP) levels including feeding carbon dioxide of High Purity grade or better to an Ultra High Purity carbon dioxide purification system.

20 Claims, 2 Drawing Sheets

Figure 1:
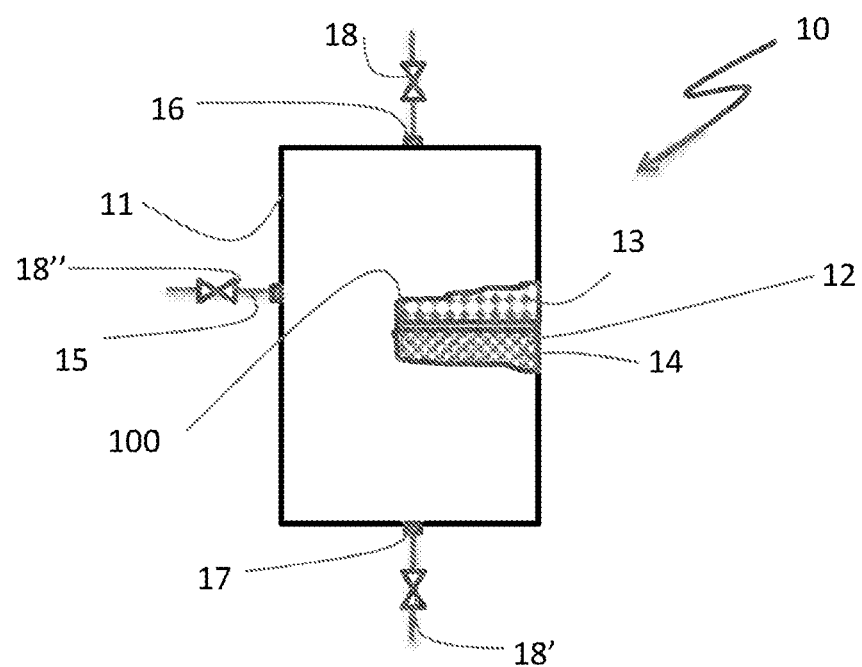

(51) Int. Cl.
*C01B 31/20* (2006.01)
*B01D 53/86* (2006.01)
*B01J 23/755* (2006.01)
*B01J 35/00* (2006.01)

(52) U.S. Cl.
CPC ......... *B01J 23/755* (2013.01); *B01J 35/0006* (2013.01); *B01D 2255/1023* (2013.01); *B01D 2255/20753* (2013.01); *B01D 2256/22* (2013.01); *B01D 2257/7025* (2013.01); *Y02C 20/20* (2013.01)

(58) Field of Classification Search
CPC ......... B01D 2255/22; B01D 2255/7025; B01J 23/44; B01J 23/755; B01J 35/0006
See application file for complete search history.

(56) References Cited

U.S. PATENT DOCUMENTS

2011/0165046 A1* 7/2011 Drews .................. B01D 53/944
423/213.5

FOREIGN PATENT DOCUMENTS

| WO | 2004/081666 A1 | 9/2004 |
| WO | 2006/084641 A2 | 8/2006 |
| WO | 2010/129413 A1 | 11/2010 |

* cited by examiner

SYSTEM AND METHOD FOR ULTRA HIGH PURITY (UHP) CARBON DIOXIDE PURIFICATION

CROSS-REFERENCE TO RELATED APPLICATIONS

The present application is the U.S. National Stage of International Patent Application No. PCT/IB2015/051614 filed on Mar. 5, 2015 which, in turn, claims priority to Italian Application No. MI2014A000415 filed on Mar. 14, 2014.

The present invention relates to a Ultra High Purity (UHP) carbon dioxide purification system and to a method for High Purity (HP) carbon dioxide purification to obtain Ultra High Purity (UHP) carbon dioxide.

UHP carbon dioxide has many industrial uses that require precise control of the impurity levels within the gas. Among the most demanding uses of gaseous $CO_2$ from a purity standpoint are semiconductor manufacturing processes with particular reference to lithographic device making processes that envision the use of gaseous and/or critical and/or supercritical $CO_2$. Additional details and information may be retrieved from the international patent application WO 2004/081666, "Immersion lithography methods using carbon dioxide" and international patent application WO 2006/084641, "Immersion liquid, exposure apparatus, and exposure process". In these methods highly energetic ultraviolet beams are utilized. The presence of hydrocarbons such as methane can alter the transmission properties of these beams and may cause the formation of carbonaceous deposits on the devices altering and impairing their functionalities.

Other gasses of concern are sulphur compounds, both for their interference and detrimental role on the final product as well as their interference in the capacity of the purifying media, see for example U.S. Pat. No. 5,674,463 for the need to remove sulphur compounds.

In all these applications the outlet purity required is often at ppb (part per billion) or sub-ppb level. As the purification systems shall be able to assure such gas quality for a given amount of time, to avoid excessive replacement, such systems require the inlet $CO_2$ to be at least of 3N (three nine) quality, meaning that 99.9% of the gas is made by $CO_2$ and therefore the cumulative upper content of other gasses can sum up to 0.1%. Carbon dioxide with such characteristics is defined as HP $CO_2$ for the purposes and meanings of the present invention, and its purification system to UHP levels is defined as UHP carbon dioxide purification system.

So for the sake of clarity, the present invention is limited to the purification of carbon dioxide with HP inlet purity level, and resulting in an UHP carbon dioxide outlet (i.e. a $CO_2$ with 4N-99.99% gas quality or better).

In view of the above explanation it is clear that a purifier according to the present invention can operate with inlet gas qualities of HP level or better.

In addition to what has been outlined above, the need and use of purified $CO_2$ is also described in the international patent application WO 2004/035178, exploiting and describing the use of mixed metal oxides such as copper and zinc oxide (Cu/ZnO); iron and manganese oxide (Fe/MnOx); nickel oxide (NiO) and titanium oxide (TiOx); palladium oxide (PdOx) and cerium oxide (CeOx); and vanadium oxide (VOx) for carbon dioxide purification.

It is to be underlined that the present invention tags a totally different problem with respect to exhaust purifying systems where carbon dioxide is contained as a minor fraction (typically less than 10%), such systems, described for example in the US patent application 2011/165046, not achieving gas purification but at the best extent just a slight concentration increase.

Differently from the solutions disclosed in the prior art, the purpose of the present invention mainly focuses on efficient solutions for methane removal from HP carbon dioxide to obtain UHP carbon dioxide. In a first aspect thereof, the invention consists in a UHP carbon dioxide purification system having an inlet and an outlet, characterized in that its upper portion proximate to said inlet is at least partially filled with supported nickel oxide, and its lower portion proximate to said outlet is at least partially filled with supported palladium oxide, and wherein said upper and lower portions of the system have a physical separation but are in fluid communication.

The expression "proximate to said inlet" specifies that supported nickel oxide is the first purification material encountered by the HP $CO_2$ to be further purified. Similarly the expression "proximate to said outlet" inlet specifies that supported palladium oxide is the second purification material encountered by the HP $CO_2$ to be further purified, or also equivalently that supported palladium oxide is downstream with respect to supported nickel oxide.

Figure 2:
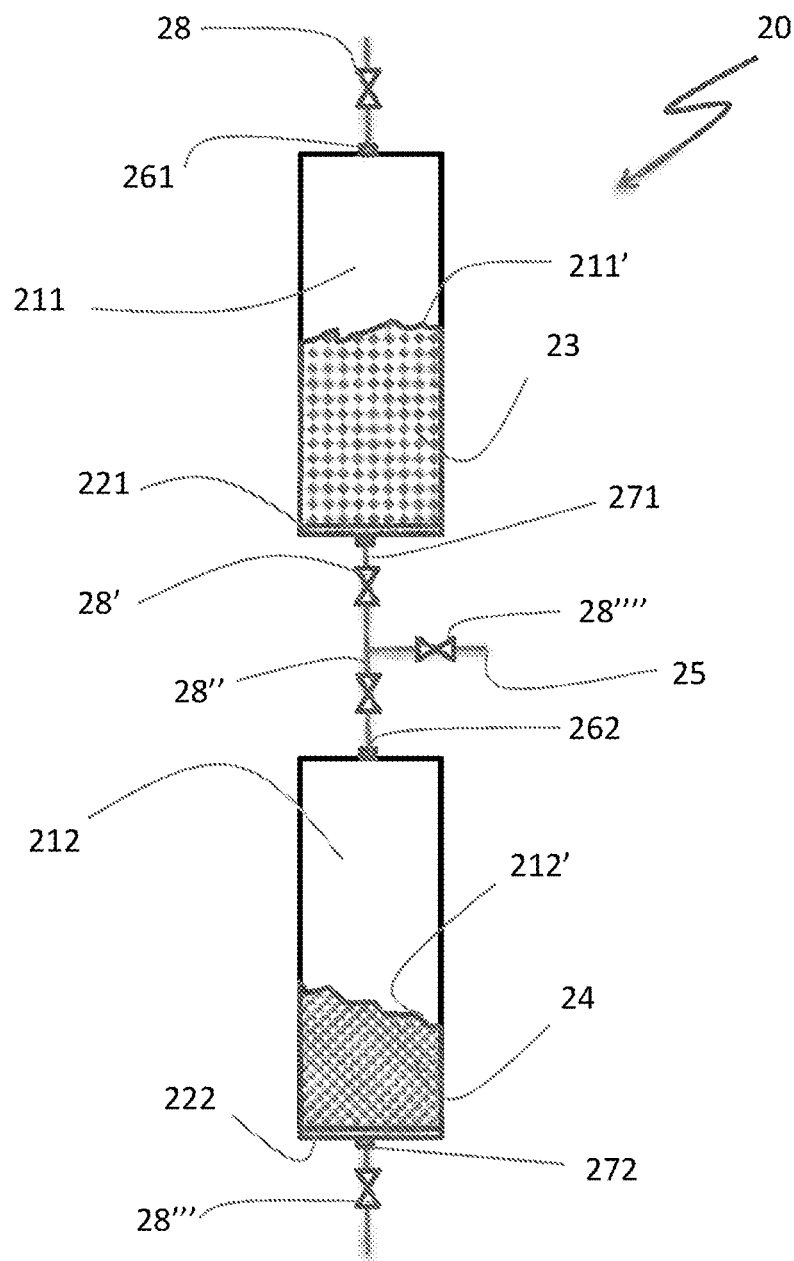

The invention will be further illustrated with the help of the following figures where:

FIG. 1 is a schematic view of a first embodiment of a purification system according to the present invention, FIG. 2 is a schematic view of an alternate embodiment of a purification system according to the present invention.

In the figures, the dimensions and dimensional ratios of the depicted elements may not be correct but in some cases have been altered in order to improve the figure readability, moreover optional or non-essential elements, such as for example heaters, flow controllers, further purification stages have not been shown.

FIG. 1 shows a purification system 10 made according to the present invention. The broken view 100 of a vessel 11 shows a particle filter 12 acting as physical separator for the supported nickel oxide 13, present in the upper portion of vessel 11, and the supported palladium oxide 14 present in the lower portion of vessel 11. In FIG. 1 is also shown a sampling port 15. The "upper portion" of the vessel is meant to be the region between the physical separator 12 (in this case a particle filter) and a vessel inlet 16, while the "lower portion" correspondingly is meant to be the region between separator 12 and a vessel outlet 17. Purification system 10 also comprises three shut-off valves 18, 18' and 18" mounted respectively on inlet 16, outlet 17 and sampling port 15.

The particle filter 12 shown in FIG. 1 is just a possible example of a suitable separator, but in principle any device or means capable of retaining the supported oxide and allowing fluid communication (i.e. carbon dioxide passage) between the upper and lower portions of the system, such as for example porous septa, screen grids, metallic meshes, perforated metallic sheets, etc. may be alternatively employed.

An alternate embodiment of a purification system 20 according to the present invention is shown in FIG. 2. In this case supported nickel oxide 23 is contained in a first vessel 211 having an inlet 261 and an outlet 271, and supported palladium oxide 24 is contained in a second vessel 212 having an inlet 262 and an outlet 272. At the bottom of each vessel 211, 212 there is placed a particle filter 221, 222 respectively. The system also includes a sampling port 25 and is completed by shut-off valves 28, 28', 28", 28''', 28'''' mounted respectively on inlet 261, outlet 271, inlet 262, outlet 272 and sampling port 25. Supported NiO 23 and supported PdO 24 respectively present in vessels 211, 212 are put in evidence respectively through broken views 211' and 212'.

As shown in FIG. 2, in this alternate embodiment outlet 271 of the first vessel 211 is directly connected, via interposed shut-off valves 28' and 28", with inlet 262 of the second vessel 212, for example by means of re-sealable gas tight VCR fittings (alternately they may be welded). In alternate embodiments, one or more additional elements may be interposed between the vessels, for example check-valves, particle filters, or as depicted in FIG. 2, shut-off valves (manually or automatically operated).

In order to have an efficient UHP carbon dioxide purification process, at least 20% of the internal volume of the upper portion of vessel 11 shall be filled with supported nickel catalyst (nickel oxide) and at least 20% of the volume of the lower portion of vessel 11 shall be filled with supported palladium catalyst (palladium oxide). In the case of two sequential and distinct vessels, this translates into a 20% volume filling with supported NiO for the first vessel 211, and 20% volume filling with supported PdO for the second vessel 212.

Any suitable support may be used for the nickel oxide and for the palladium oxide, the most common type of supports being alumina, activated carbon, and/or $SiO_2$. For nickel oxide it is preferred to use $SiO_2$ as the supporting element, in some cases in combination with MgO (usually in the range of a few percent), while for palladium oxide the preferred support is alumina. In any case the surface area for both materials is preferably higher than 50 $m^2/g$ and ideally higher than 100 $m^2/g$.

It is to be stressed that the nature of the materials changes in the course of the purification system lifetime, in particular NiO reacts with sulphur compounds present in the carbon dioxide stream and therefore with time there is an evolution leading to the progressive consumption of the NiO whereas the PdO reaction with methane is purely catalytic and triggered by the presence of oxygen.

The reduced 20% volume filling takes into account both the consumption phenomena as well as the fact that part of the vessels may contain other purification materials, for example the lower part of the vessels may contain molecular sieves.

Also it is preferred to have the weight ratio of the supported NiO contained in the upper portion of the purification system with respect to the supported PdO contained in the lower portion of the purification system comprised between 10 and 0.1, preferably between 5 and 0.2.

Furthermore, the purification systems according to the present invention are preferably equipped with one or more heaters and temperature detecting devices (typically thermocouples) in order to control the temperature of the two supported media (NiO, PdO).

In the embodiment envisioning two vessels in sequence, the first filled with supported nickel oxide at least by 20% and the second filled with supported palladium oxide at least by 20%, each of the vessels is equipped with its own heater and temperature detecting devices (preferred is the use of thermocouples).

As already outlined, the efficient removal of methane by the supported PdO requires the presence of oxygen, so in a preferred embodiment the purification system according to the present invention envisions the presence of an additional inlet for the addition of oxygen. It is to be emphasized that this additional inlet is optional since oxygen could be pre-mixed with the gas to be purified, for example by an external blending system, moreover oxygen addition could be superfluous and at certain levels even detrimental if the incoming gas to be purified has an oxygen concentration higher than methane. In any case the oxygen concentration should be kept equal to or less than 50 ppm (parts per million), as per above explanation, since the present invention is related to a UHP carbon dioxide purifier, and the incoming gas specifications are such that a higher oxygen concentration would be detrimental and would negatively affect the output gas quality, as also oxygen is a gaseous species to be kept under control.

In a further embodiment, the purification system according to the present invention has a gas sampling port for sulphur compounds detection.

In the case of a two-vessel purification system this sampling port could be placed between the first vessel and the second vessel, or alternately be located in the lower part of the first vessel (below the median point) but at a distance from the outlet at least equal to h/20, where h is defined as the first vessel height (the distance between the inlet and outlet).

All the vessels used in the purification system according to the present invention are hermetically sealed vessels, normally made of metal. Typically said vessels are made of stainless steel and particle filters are preferably placed immediately before their outlets.

There are no particular requirements or constraints on the geometries and structures of the vessels, even though the most common geometry for the vessels is cylindrical with a height to radius ratio preferably comprised between 0.1 and 10.

It is to be underlined that the purification system according to the present invention may be part of a bigger purification system, in particular it could be considered a pre-purification stage to be followed by one or more additional stage(s) for impurity removal, such as the removal of unreacted oxygen.

In a second aspect thereof the invention consists of a method for the purification or pre-purification of HP $CO_2$ comprising feeding an oxygen-enriched HP $CO_2$ gaseous stream to a purification system having an inlet and an outlet, characterized in that the upper portion of said system is at least partially filled with supported nickel oxide and its lower portion is at least partially filled with supported palladium oxide, and wherein said upper and lower portions of the system have a physical separation but are in fluid communication.

Preferably the purification method according to the present invention is carried out by heating the purification system at a temperature comprised between 150° C. and 400° C., more preferably between 275° C. and 350° C.

An alternate embodiment of the method according to the present invention achieves the physical separation and fluid communication by means of two connected and separate purification vessels, with a first vessel at least partially filled with supported nickel oxide and having an inlet and an outlet, which outlet is in communication with an inlet of a second vessel at least partially filled with supported palladium oxide.

Also, in this alternate embodiment of the method according to the present invention it is preferred to heat the purifying materials (the supported oxides), heating the first vessel at a temperature preferably comprised between 150° C. and 400° C., more preferably between 200° C. and 350° C., and the second vessel at a temperature preferably comprised between 250° C. and 400° C. more preferably between 275° C. and 350° C.

The method according to the present invention is applied to an oxygen-enriched HP CO$_2$ gaseous stream. Oxygen enrichment for the purpose of the present invention means that the amount of oxygen is at least twice the amount of methane present, but it any case not higher than 50 ppm, to avoid using a CO$_2$ whose characteristics are not the ones of a HP gas (since the presence of oxygen and other gasses would violate the 0.1% upper cumulative concentration limit). This incoming oxygen level may occur spontaneously as it may be a characteristic of the gas entering the purification system, so in this case there is no need to perform an oxygen addition since the HP CO$_2$ is already rich in O$_2$, otherwise oxygen should be added to the incoming HP CO$_2$. The preferred concentration of oxygen in the carbon dioxide stream to be purified is between 2 and 50 times the methane concentration, preferably between 2.5 and 10 times. The oxygen addition may be done on the basis of the incoming gas specification or more preferably is adjusted via a blending system based on the readout of a methane analyser that samples HP CO$_2$ before the purification system inlet. In any case the above addition should not exceed the 50 ppm oxygen limit outlined above.

The method according to the present invention is not restricted to any particular flow of HP carbon dioxide to be purified, even if it is preferred to couple bigger vessels with higher carbon dioxide flows. As an example of a suitable coupling between material amount and flows, a preferred interval is between 0.1 and 10 liters of supported PdO for purifying a CO$_2$ flow of 10 m$^3$/h. It is to be remarked that, apart from the previous non-limiting example, vessel dimensioning and scaling for different flow rates is well within the standard capability of a person skilled in the art.

Preferably the method according to the present invention envisions the continuous or periodical analysis of sulphur compounds. In a more preferred embodiment of the method according to the present invention for a two-vessel configuration, the gas from the outlet of the first vessel or the gas in the lowest portion of the first vessel is periodically sampled for the detection of sulphur compounds. Sampling can be made through a dedicated port and could be done manually or automatically. The sampled gas can be immediately sent to a suitable analyser like a total sulphur chemiluminescence detector (SCD) or to a sampling collection system such as a concentrator system or a gas reservoir for offline analysis, such as but not limited to a gas chromatograph. The second solution has the disadvantage of not providing an immediate response, but allows for higher sensitivity due to the concentration of the sulphur compounds in the collection system.

In a preferred embodiment the method according to the present invention envisions the replacement of the first vessel with a new one containing fresh material (supported NiO) when the concentration of sulphur compounds in the sample gas is higher than a threshold, preferably comprised between 10 ppb and 50 ppb (parts per billion).

The purification method according to the present invention may be a stand-alone process or otherwise a pre-purification stage of a more complex UHP carbon dioxide purification process.

The invention claimed is:

1. An Ultra High Purity (UHP) carbon dioxide purification system having an inlet and an outlet, wherein its upper portion proximate to said inlet is at least partially filled with supported nickel oxide and its lower portion proximate to said outlet is at least partially filled with supported palladium oxide, and wherein said upper and lower portions of the purification system have a physical separation but are in fluid communication.

2. The Ultra High Purity carbon dioxide purification system according to claim 1, wherein said physical separation and fluid communication is achieved by means of one or more of a metallic mesh, a porous septum, a screen grid, a particle filter or a perforated metallic sheet interposed between said upper portion and said lower portion.

3. The Ultra High Purity carbon dioxide purification system according to claim 1, wherein said physical separation and fluid communication is achieved by means of a first vessel at least partially filled with supported nickel oxide and having an inlet and an outlet, which outlet is in communication with an inlet of a second vessel that is at least partially filled with supported palladium oxide.

4. The Ultra High Purity carbon dioxide purification system according to claim 3, wherein said outlet of the first vessel is directly connected to said inlet of the second vessel, said direct connection preferably including one or more shut-off valves placed between the vessels.

5. The Ultra High Purity carbon dioxide purification system according to claim 1, wherein the weight ratio of the supported nickel oxide to the supported palladium oxide is comprised between 10 and 0.1, preferably between 5 and 0.2.

6. The Ultra High Purity carbon dioxide purification system according to claim 1, wherein at least 20% of the upper portion volume is filled with supported nickel oxide and at least 20% of the lower portion volume is filled with supported palladium oxide.

7. The Ultra High Purity carbon dioxide purification system according to claim 1, wherein said system is equipped with at least one heater and one temperature detecting device.

8. The Ultra High Purity carbon dioxide purification system according to claim 3, wherein said first vessel and said second vessel are each equipped with a heater and one or more temperature detecting devices.

9. The Ultra High Purity carbon dioxide purification system according to claim 1, further comprising an oxygen addition inlet.

10. The Ultra High Purity carbon dioxide purification system according to claim 1, further comprising a sampling port.

11. The Ultra High Purity carbon dioxide purification system according to claim 3, wherein said sampling port is positioned between the inlet of the first vessel and the inlet of the second vessel.

12. The Ultra High Purity carbon dioxide purification system according to claim 11, wherein said sampling port is positioned in the lowest portion of the first vessel.

13. The Ultra High Purity carbon dioxide purification system according to claim 11, wherein said sampling port is positioned between the outlet of the first vessel and the inlet of the second vessel.

14. A method for the purification or pre-purification of High Purity (HP) carbon dioxide to Ultra High Purity (UHP) levels, comprising:
    feeding carbon dioxide of High Purity grade or better to an Ultra High Purity carbon dioxide purification system made according to claim 1.

15. The method according to claim 14, wherein up to 50 ppm of oxygen are added to the incoming High Purity carbon dioxide gaseous stream.

16. The method according to claim 15, wherein said added oxygen is comprised between 2 and 50 times the nominal inlet methane concentration.

17. The method according to claim 14, wherein said purification system is heated at a temperature comprised between 150° C. and 400° C., preferably comprised between 275° C. and 350° C.

18. The method according to claim 17, wherein in case said purification system includes a first vessel at least partially filled with supported nickel oxide and a second vessel at least partially filled with supported palladium oxide, said first vessel is heated at temperature comprised between 150° C. and 400° C., more preferably comprised between 200° C. and 350° C., and said second vessel is heated at a temperature comprised between 250° C. and 400° C., more preferably comprised between 275° C. and 350° C.

19. The method according to claim 14, wherein the gas in the purification system is sampled and analysed for the level of sulphur compounds.

20. The method according to claim 19, wherein in case said purification system includes a first vessel at least partially filled with supported nickel oxide and a second vessel at least partially filled with supported palladium oxide, said first vessel is replaced with a new one containing fresh supported nickel oxide when said level of sulphur compounds is equal to or higher than a threshold, said threshold being preferably comprised between 10 and 50 ppb.

* * * * *